United States Patent
Kang et al.

(10) Patent No.: US 11,387,975 B2
(45) Date of Patent: Jul. 12, 2022

(54) SYSTEM AND METHOD FOR DISTRIBUTED COORDINATION OF DUPLEX DIRECTIONS IN A NR SYSTEM

(71) Applicant: Telefonaktiebolaget LM Ericsson (publ), Stockholm (SE)

(72) Inventors: Du Ho Kang, Upplands Väsby (SE); Jung-Fu Cheng, Fremont, CA (US); Sorour Falahati, Stockholm (SE); Havish Koorapaty, Saratoga, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 309 days.

(21) Appl. No.: 16/310,868

(22) PCT Filed: Feb. 8, 2018

(86) PCT No.: PCT/SE2018/050114
§ 371 (c)(1),
(2) Date: Dec. 18, 2018

(87) PCT Pub. No.: WO2018/147789
PCT Pub. Date: Aug. 16, 2018

(65) Prior Publication Data
US 2020/0313836 A1    Oct. 1, 2020

Related U.S. Application Data

(60) Provisional application No. 62/458,349, filed on Feb. 13, 2017.

(51) Int. Cl.
*H04L 5/14*     (2006.01)
*H04W 72/12*   (2009.01)

(52) U.S. Cl.
CPC ............... *H04L 5/14* (2013.01); *H04W 72/12* (2013.01)

(58) Field of Classification Search
None
See application file for complete search history.

(56) References Cited

U.S. PATENT DOCUMENTS 5,884,145 A * 3/1999 Haartsen ............. H04W 72/082
                                                          455/63.2
5,885,145 A * 3/1999 O'Mara ............... A46B 13/008
                                                          15/22.2

(Continued)

FOREIGN PATENT DOCUMENTS

| EP | 2 871 900 A1 | 5/2015 | |
|----|--------------|--------|---|
| EP | 2871900 A1 * | 5/2015 | ........... H04L 5/1469 |
| WO | 2015 027389 A1 | 8/2013 | |

OTHER PUBLICATIONS

NTT DOCOMO, "Discussion on Backhaul Signaling for eIMTA", 3GPP TSG RAN WG1 Meeting #74, Barcelona, Spain, Aug. 19-23, 2013, R1-133450 (Year: 2013).*

(Continued)

*Primary Examiner* — Joseph A Bednash
(74) *Attorney, Agent, or Firm* — Baker Botts, LLP

(57) ABSTRACT

According to certain embodiments, a method in a first network node scheduling time-division-duplexing (TDD) transmission for a first cell is provided. The method includes receiving transmission direction planning information from a plurality of other network nodes scheduling TDD transmissions for other cells. At least one transmission direction plan of the first network node is adapted based on the transmission direction planning information received from the plurality of other network nodes.

30 Claims, 12 Drawing Sheets

(56) References Cited

U.S. PATENT DOCUMENTS

| | | | | |
|---|---|---|---|---|
| 2010/0302946 | A1* | 12/2010 | Yang | H04L 47/30 |
| | | | | 370/235 |
| 2015/0003301 | A1* | 1/2015 | He | H04W 16/14 |
| | | | | 370/280 |
| 2015/0071213 | A1* | 3/2015 | Pajukoski | H04W 72/1284 |
| | | | | 370/329 |
| 2015/0365941 | A1 | 12/2015 | Liu et al. | |

OTHER PUBLICATIONS

3GPP TSG RAN WG1 Meeting #74; Barcelona, Spain; Source: NTT DOCOMO; Title: Discussion on Backhaul Signaling for eIMTA (R1-133450)—Aug. 19-23, 2013.

3GPP TSG RAN WG1 #87; Reno, USA; Source: Samsung; Title: Signaling of Slot Structure (R1-1612565)—Nov. 14-18, 2016.

PCT Notification of Transmittal of the International Search Report and the Written Opinion of the International Searching Authority, or the Declaration for International application No. PCT/SE2018/050114—Apr. 19, 2018.

* cited by examiner

SYSTEM AND METHOD FOR DISTRIBUTED COORDINATION OF DUPLEX DIRECTIONS IN A NR SYSTEM

PRIORITY

This nonprovisional application in a U.S. National Stage-Filing under 35 U.S.C. § 371 of international Patent Application Serial No. PCT/SE2018/050114 filed Feb. 8, 2018, and entitled "SYSTEM AND METHOD FOR DISTRIBUTED COORDINATION OF DUPLEX DIRECTIONS IN A NR SYSTEM" which claims priority to U.S. Provisional Patent Application No. 62/458,349 filed Feb. 13, 2017, both of which are hereby incorporated by reference in their entirety.

TECHNICAL FIELD

The present disclosure relates, in general, to wireless communications and, more particularly, to a system and method for scheduling a time-division-duplexing (TDD) transmission for a cell.

BACKGROUND

In the Third Generation Partnership Project (3GPP), there is an ongoing Study Item that looks into a new radio interface for 5G. Terms for denoting this new and next generation technology have not yet converged, so the terms NR and 5G are used interchangeably herein. Moreover, a base-station can be referred to as a gNB instead of an eNodeB (eNB). Alternatively, the term Transmission-Receive-Point (TRP) can also be used.

Traditional Long Term Evolution (LTE) technology only supports static or semi-static time division duplex (TDD), where time domain resources are split between downlink (DL) and uplink (UL) based on a long-term configuration or only once every N subframes. This can be very inefficient, particularly when only one traffic direction exists since the other dedicated time resource for the other direction is wasted. NR will likely include flexible duplex operations in order to maximally utilize given radio resources in the most efficient way for both traffic directions.

The flexible duplex operation can be defined as follows:
The time domain resources can be dynamically allocated to DL or UL traffic by a base station scheduler based on the UL and DL traffic needs observed by the base station.

Flexible duplex may bring significant performance gain at the low to medium load compared to the traditional static TDD in LTE since flexible duplex does not have any restriction on the usage of time domain resources in a certain period.

Certain previous techniques perform coordination based on explicit signaling to address cross-link interference among co-located macro cells. However, such systems have a high overhead distributed backhaul and require co-location.

SUMMARY

According to certain embodiments, a method in a first network node scheduling time-division-duplexing (TDD) transmission for a first cell is provided. The method includes receiving transmission direction planning information from a plurality of other network nodes scheduling TDD transmissions for other cells. At least one transmission direction plan of the first network node is adapted based on the transmission direction planning information received from the plurality of other network nodes.

According to certain embodiments, a first network node scheduling TDD transmissions for a first cell is disclosed. The first network node comprises processing circuitry configured to receive transmission direction planning information from a plurality of other network nodes scheduling TDD transmissions for other cells. At least one transmission direction plan of the first network node is adapted based on the transmission direction planning information received from the plurality of other network nodes.

According to certain embodiments, a non-transitory computer readable medium storing instructions is provided. The instructions are executable by a processor scheduling TDD transmissions for a first cell to cause the processor to receive transmission direction planning information from a plurality of other network nodes scheduling TDD transmissions for other cells and adapt at least one transmission direction plan of the processor based on the transmission direction planning information received from the plurality of other network nodes.

According to certain embodiments, a method in a first network node includes obtaining transmission direction planning information from a plurality of network nodes which could include the first network node, each of the plurality of network nodes scheduling TDD transmissions for a respective cell. At least one transmission direction plan of at least one of said plurality of network nodes is adapted based on the transmission direction planning information received from the plurality of other network nodes.

According to certain embodiments, a non-transitory computer readable medium stores instructions executable by a processor to cause the processor to obtain transmission direction planning information from a plurality of network nodes which could include the first network node. Each of the plurality of network nodes is scheduling TDD transmissions for a respective cell. At least one transmission direction plan of at least one of said plurality of network nodes is adapted based on the transmission direction planning information received from the plurality of network nodes.

Certain embodiments of the present disclosure may provide one or more technical advantages. For example, certain embodiments may advantageously reduce cross-link interference with minimal backhaul signaling overhead. As another example, certain embodiments may employ distributed backhaul joint direction scheduling, which may not require central coordination entity. Accordingly, certain embodiments may provide a scalable solution. As still another example, certain embodiments may provide coordination signaling for joint direction scheduling among nodes that are not necessarily co-located.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

As described above, fully distributed interference management without inter-cell signaling for switching between static duplex and flexible duplex provides some benefits without requiring any signaling for joint direction signaling. However, in some instances, cross-link interference may not be avoided without coordination signaling. Some systems provide explicit signaling. However, such systems may only address cross-link interference among co-located macro cells.

The present disclosure contemplates various embodiments that may address these and other deficiencies associated with existing approaches. For example, certain embodiments provide low-overhead backhaul signaling for joint direction scheduling when a fully distributed dynamic mode switch between static TDD and flexible duplex is used. In certain particular embodiments, 1 bit or 2 bit distributed signaling may be used to indicate the cell level buffer state per direction. As such, certain embodiments inform other cells to adaptively choose traffic direction.

According to certain embodiments, for example, a network node (e.g., AP, eNB, gNB) scheduling TDD transmissions in a first cell receives transmission direction planning information from a plurality of other network nodes. The network node aggregates the transmission direction planning information received from the plurality of network nodes and adapts at least one transmission direction plan of the network node based on the transmission direction planning information. According to certain embodiments, the transmission direction plan may define which TDD mode to be used by the first cell during at least one upcoming transmission time interval.

Figure 1:
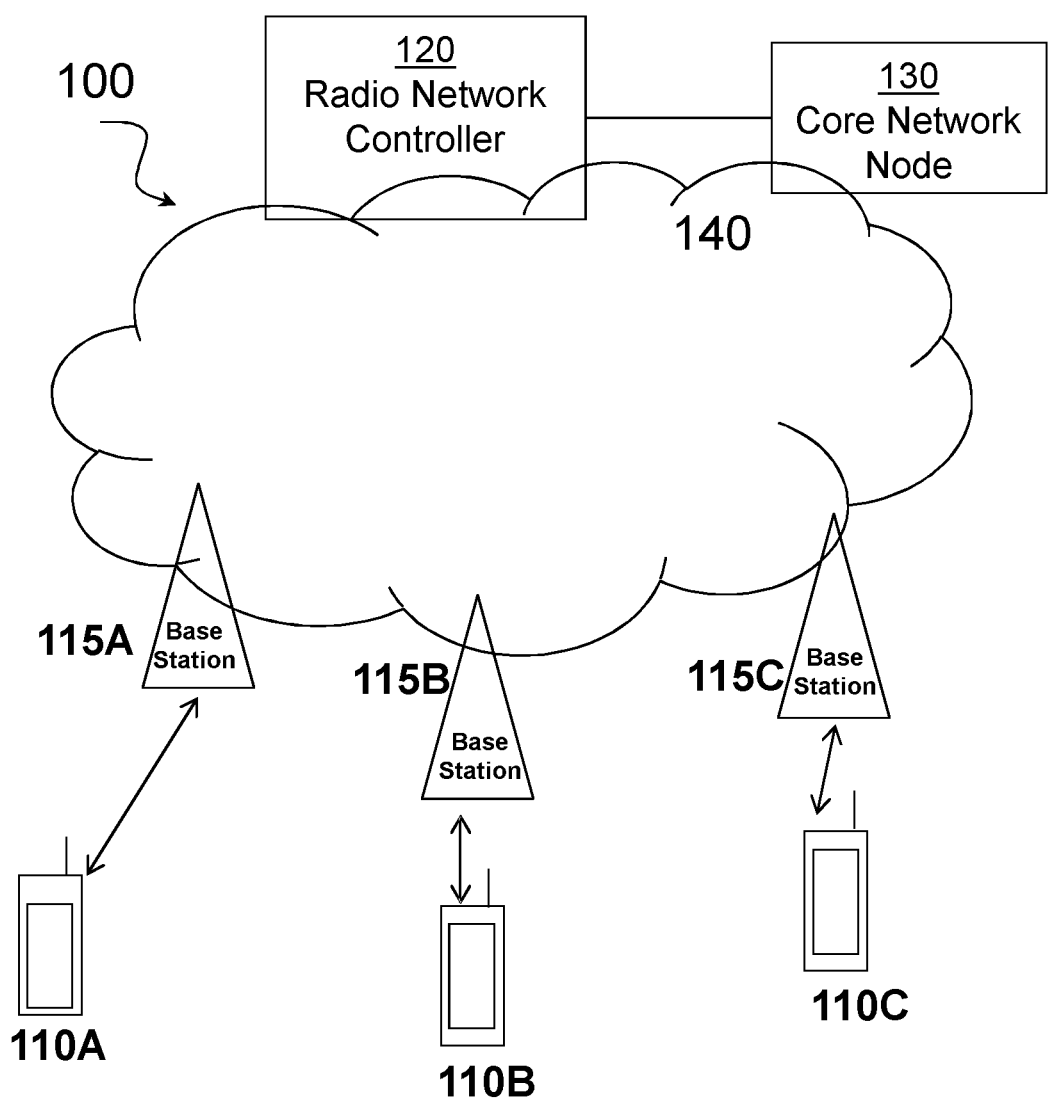
FIG. 1 is a block diagram illustrating an embodiment of a network, in accordance with certain embodiments.

FIG. 1 is a block diagram illustrating an embodiment of a network 100, in accordance with certain embodiments. Network 100 includes one or more UE(s) 110 (which may be interchangeably referred to herein as wireless devices 110, terminals 110, or handsets 110) and one or more network node(s) 115 (which may be interchangeably referred to as eNBs 115, APs 115, TRPs 115, or gNBs 115). UEs 110 may communicate with network nodes 115 over a wireless interface. For example, a UE 110 may transmit wireless signals to one or more of network nodes 115, and/or receive wireless signals from one or more of network nodes 115. The wireless signals may contain voice traffic, data traffic, control signals, and/or any other suitable information. In some embodiments, an area of wireless signal coverage associated with a network node 115 may be referred to as a cell 125. In some embodiments, UEs 110 may have device-to-device (D2D) capability. Thus, UEs 110 may be able to receive signals from and/or transmit signals directly to another UE.

In certain embodiments, network nodes 115 may interface with a radio network controller. The radio network controller may control network nodes 115 and may provide certain radio resource management functions, mobility management functions, and/or other suitable functions. In certain embodiments, the functions of the radio network controller may be included in network node 115. The radio network controller may interface with a core network node (not depicted). In certain embodiments, the radio network controller may interface with the core network node via an interconnecting network 120. Interconnecting network 120 may refer to any interconnecting system capable of transmitting audio, video, signals, data, messages, or any combination of the preceding. Interconnecting network 120 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for UEs 110. UEs 110 may exchange certain signals with the core network node using the non-access stratum layer. In non-access stratum signaling, signals between UEs 110 and the core network node may be transparently passed through the radio access network. In certain embodiments, network nodes 115 may interface with one or more network nodes over an internode interface, such as, for example, an X2 interface.

As described above, example embodiments of network 100 may include one or more wireless devices 110, and one or more different types of network nodes capable of communicating (directly or indirectly) with wireless devices 110.

In some embodiments, the non-limiting term UE is used. UEs 110 described herein can be any type of wireless device capable of communicating with network nodes 115 or another UE over radio signals. UE 110 may also be a radio communication device, target device, D2D UE, machine-type-communication UE or UE capable of machine to machine communication (M2M), low-cost and/or low-complexity UE, a sensor equipped with UE, Tablet, mobile terminals, smart phone, laptop embedded equipped (LEE), laptop mounted equipment (LME), USB dongles, Customer Premises Equipment (CPE), etc. UE 110 may operate under either normal coverage or enhanced coverage with respect to its serving cell. The enhanced coverage may be interchangeably referred to as extended coverage. UE 110 may also operate in a plurality of coverage levels (e.g., normal coverage, enhanced coverage level 1, enhanced coverage level 2, enhanced coverage level 3 and so on). In some cases, UE 110 may also operate in out-of-coverage scenarios.

Also, in some embodiments, generic terminology, "network node" is used. It can be any kind of network node, for example a radio network node such as a base station (BS), radio base station, Node B, multi-standard radio (MSR) radio node such as MSR BS, evolved Node B (eNB), TRP, gNB, network controller, radio network controller (RNC), base station controller (BSC), relay node, relay donor node controlling relay, base transceiver station (BTS), AP, radio access point, transmission points, transmission nodes, Remote Radio Unit (RRU), Remote Radio Head (RRH), nodes in distributed antenna system (DAS), Multi-cell/multicast Coordination Entity (MCE), core network node (e.g., MSC, MME, etc.), O&M, OSS, SON, positioning node (e.g., E-SMLC), MDT, or any other suitable network node.

As used herein, the terms user equipment (UE), terminal, handset, etc. are used interchangeably to denote a device that communicates with the network infrastructure. These terms should not be construed to mean any specific type of device. Rather, they apply to any suitable device, and the various embodiments described herein are applicable to all devices. Similarly, the term base-station is intended to denote a node in the network infrastructure that communicates with a UE. Different names may be applicable, and the functionality of the base-station may also be distributed in various ways. For example, in certain embodiments a radio head may terminate parts of the radio protocols and a centralized unit may terminate other parts of the radio protocols. The present disclosure does not distinguish such implementations; rather, the term base-station refers to all alternative architectures that can implement the various embodiments described herein. Furthermore, the terminology such as network node and UE should be considered non-limiting and does in particular not imply a certain hierarchical relation between the two; in general "eNodeB" could be considered as device 1 and "UE" device 2, and these two devices communicate with each other over some radio channel.

Example embodiments of UE 110, network nodes 115, and other network nodes (such as radio network controller or core network node) are described in more detail below with respect to FIGS. 2-12.

Although FIG. 1 illustrates a particular arrangement of network 100, the present disclosure contemplates that the various embodiments described herein may be applied to a variety of networks having any suitable configuration. For example, network 100 may include any suitable number of UEs 110 and network nodes 115, as well as any additional elements suitable to support communication between UEs or between a UE and another communication device (such as a landline telephone). Furthermore, although certain embodiments may be described as implemented in a Long Term Evolution (LTE) network, the embodiments may be implemented in any appropriate type of telecommunication system supporting any suitable communication standards (including 5G standards) and using any suitable components, and are applicable to any radio access technology (RAT) or multi-RAT systems in which a UE receives and/or transmits signals (e.g., data). For example, the various embodiments described herein may be applicable to LTE, LTE-Advanced, NR, 5G, UMTS, HSPA, GSM, cdma2000, WCDMA, WiMax, UMB, WiFi, another suitable radio access technology, or any suitable combination of one or more radio access technologies. Although certain embodiments may be described in the context of wireless transmissions in the downlink, the present disclosure contemplates that the various embodiments are equally applicable in the uplink.

Various example embodiments are described in more detail below. In the following, the term Access Point (AP) may be used interchangeably with network node (e.g., TRP/eNB/gNB).

Figure 2:
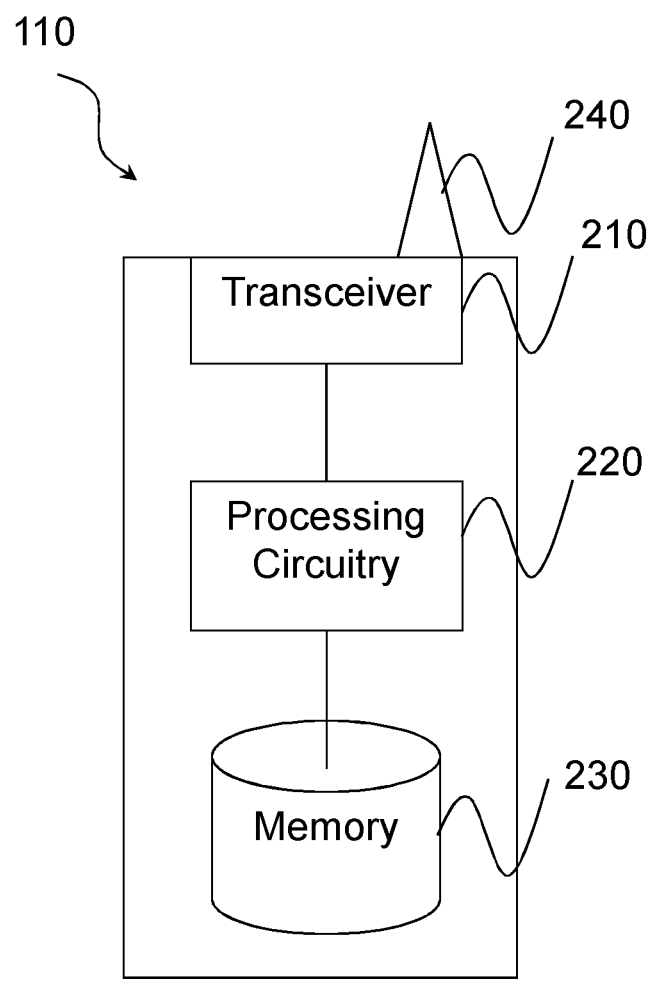
FIG. 2 is a block schematic of an exemplary wireless device, in accordance with certain embodiments.

FIG. 2 is a block schematic of an exemplary wireless device, in accordance with certain embodiments. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 110 may also be referred to as UE, a station (STA), a device, a terminal, or a handset in some embodiments. Wireless device 110 includes transceiver 210, processing circuitry 220, and memory 230. In some embodiments, transceiver 210 facilitates transmitting wireless signals to and receiving wireless signals from network node 115 (e.g., via antenna 240), processing circuitry 220 executes instructions to provide some or all of the functionality described above as being provided by wireless device 110, and memory 230 stores the instructions executed by processing circuitry 220.

Processing circuitry 220 may include any suitable combination of hardware and software implemented in one or more modules to execute instructions and manipulate data to perform some or all of the described functions of wireless device 110, such as the functions of wireless device 110 described above in relation to FIGS. 4-7. In some embodiments, processing circuitry 220 may include, for example, one or more computers, one or more central processing units (CPUs), one or more microprocessors, one or more applications, one or more application specific integrated circuits (ASICs), one or more field programmable gate arrays (FPGAs) and/or other logic.

Memory 230 is generally operable to store instructions, such as a computer program, software, an application including one or more of logic, rules, algorithms, code, tables, etc. and/or other instructions capable of being executed by processing circuitry. Examples of memory 230 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processing circuitry 220.

Other embodiments of wireless device 110 may include additional components beyond those shown in FIG. 2 that may be responsible for providing certain aspects of the wireless device's functionality, including any of the functionality described above and/or any additional functionality (including any functionality necessary to support the solution described above). As just one example, wireless device 110 may include input devices and circuits, output devices, and one or more synchronization units or circuits, which may be part of processing circuitry 220. Input devices include mechanisms for entry of data into wireless device 110. For example, input devices may include input mechanisms, such as a microphone, input elements, a display, etc. Output devices may include mechanisms for outputting data in audio, video and/or hard copy format. For example, output devices may include a speaker, a display, etc.

Figure 3:
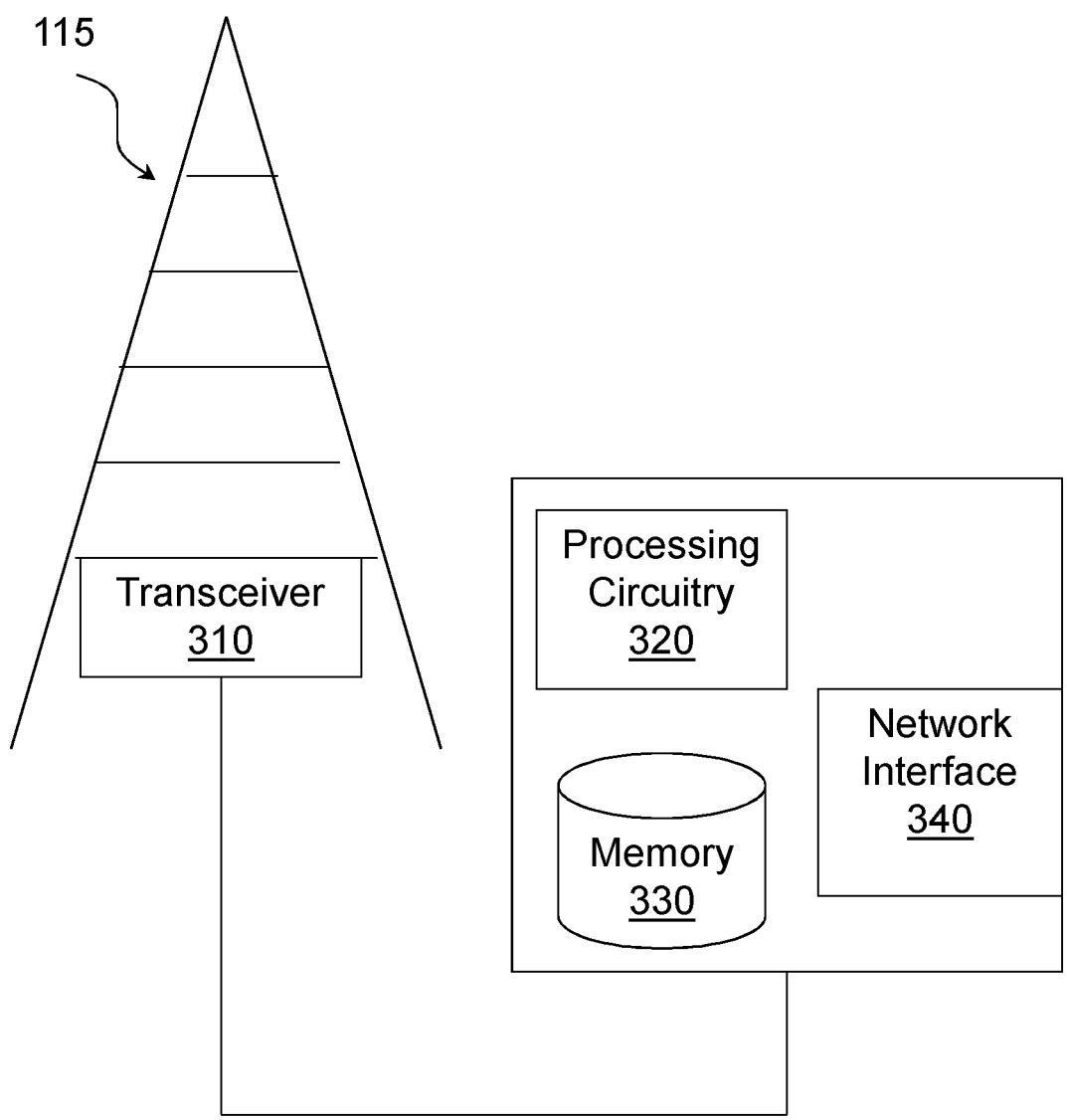
FIG. 3 is a block schematic of an exemplary network node, in accordance with certain embodiments.

FIG. 3 is a block schematic of an exemplary network node, in accordance with certain embodiments. Network node 115 may be any type of radio network node or any network node that communicates with a UE and/or with another network node. Examples of network node 115 include an eNodeB, a gNB, a TRP, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network nodes 115 may be deployed throughout network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 310, processing circuitry 320, memory 330, and network interface 340. In some embodiments, transceiver 310 facilitates transmitting wireless signals to and receiving wireless signals from wireless device 110 (e.g., via antenna 240), processing circuitry 320 executes instructions to provide some or all of the functionality described above as being provided by a network node 115, memory 330 stores the instructions executed by processing circuitry 320, and network interface 340 communicates signals to backend network components, such as a gateway, switch, router, Internet, Public Switched Telephone Network (PSTN), core network nodes or radio network controllers 130, etc.

Processing circuitry 320 may include any suitable combination of hardware and software implemented in one or more modules to execute instructions and manipulate data to perform some or all of the described functions of network node 115, such as those described in relation to FIGS. 4-7. In some embodiments, processing circuitry 320 may include, for example, one or more computers, one or more central processing units (CPUs), one or more microprocessors, one or more applications, and/or other logic.

Memory 330 is generally operable to store instructions, such as a computer program, software, an application including one or more of logic, rules, algorithms, code, tables, etc. and/or other instructions capable of being executed by a processor. Examples of memory 330 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 340 is communicatively coupled to processing circuitry 320 and may refer to any suitable device operable to receive input for network node 115, send output from network node 115, perform suitable processing of the input or output or both, communicate to other devices, or any combination of the preceding. Network interface 340 may include appropriate hardware (e.g., port, modem, network interface card, etc.) and software, including protocol conversion and data processing capabilities, to communicate through a network.

Other embodiments of network node 115 may include additional components beyond those shown in FIG. 3 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

According to certain embodiments, low-overhead backhaul signaling is provided for joint direction scheduling. Specifically, the signaling may be used in a fully distributed dynamic mode to switch between static TDD and flexible duplex. In particular embodiments, 1 bit or 2 bit signaling may indicate the cell level buffer state per direction to inform other cells to adaptively choose traffic direction. The disclosed techniques may reduce mutual interference between network nodes 115 operating flexible duplex on the same frequency. As used herein, flexible duplex may refer to flexibly changing transmission direction in a TDD system. As will be described in more detail below, the techniques may include network nodes 115 exchanging transmission direction planning information and adapt their transmissions in accordance to aggregated information received from other network nodes 115. In certain embodiments, the transmission direction planning information may be exchanged in a compressed format.

In certain embodiments, network nodes 115 transmission direction planning information related to their buffer states. For example, the transmission direction planning information may indicate buffer state changes. In a particular embodiment, the buffer state information may be conveyed in terms of the number of total bits that need to be delivered in both the DL and the UL direction. In another particular embodiment, the buffer state information may be conveyed in terms of the number of fixed higher layer packets that need to be delivered.

In a particular embodiment, for example, network nodes 115 may exchange information based on the following four possible states:
  State 0 (also known herein as a first state): both DL and UL buffer are empty
  State 1 (also known herein as a second state): only DL buffer is non-empty
  State 2 (also known herein as a third state): only UL buffer is non-empty
  State 3 (also known herein as a fourth state): DL buffer is non-empty AND UL buffer is non-empty In certain embodiments, the buffer state may be further differentiated to provide more information of the preferred traffic plans. In a particular embodiment, for example, State 3, as described above, may be split into three possible new states:
  State 3a (also known herein as first sub-state): Non-empty DL and UL buffers with no preference to UL/DL transmission ratios
  State 3b (also known herein as a second sub-state): Non-empty DL and UL buffers with preference of a high DL to UL transmission ratio
  State 3c (also known herein as a third sub-state): Non-empty DL and UL buffers with preference of a low DL to UL transmission ratio In certain embodiments, network nodes 115 may exchange transmission direction planning information related to their respective traffic patterns. That is, network nodes 115 may exchange information on their regularly planned future transmissions or their predicted transmissions. In certain other embodiments, network nodes 115 may exchange information on the DL to UL traffic ratios expected over a fixed number of upcoming subframes.

According to certain embodiments, network node 115 aggregates the information received from other network nodes 115. In a particular embodiment, for example, network node 115 may determine a respective type of the information received from each of the other network nodes 115. Network node 115 may then count the number received of each type. In a particular example embodiment, network node 115 may take a windowed count of the received information. In another particular embodiment, network node 115 may apply exponential forgetting factors on the previous count of received information.

According to certain embodiments, network node 115 adapts its transmission direction plan based on the aggregated information. The transmission direction plan may define which TDD mode to be used by the first cell during at least one upcoming transmission time interval. According to various embodiments, network node 115 may switch between a number of transmission modes based on the aggregated information. In a particular embodiment, for example, network node 115 switches between two modes: a static duplex mode and a flexible duplex mode. In another example embodiment, network node 115 switches between four modes: a static duplex mode with equal DL/UL transmission ratio, a static duplex mode with high DL/UL transmission ratio, a static duplex mode with low DL/UL transmission ratio, and a flexible duplex mode.

To substantiate the teachings described above, non-limiting exemplary embodiments of the invention are described below. One skilled in the art may recognize that these exemplary embodiments apply the various teachings described above. However, the variations and combinations of the above techniques may be combined and or modified as suitable.

In a first exemplary embodiment, 1 bit backhaul signaling based joint direction scheduling is used. A buffer state may operate as a trigger. In certain embodiments, four buffer states may be defined in a given cell:
State 0: both DL and UL buffer are empty
State 1: only DL buffer is non-empty
State 2: only UL buffer is non-empty
State 3: DL buffer is non-empty AND UL buffer is non-empty At a given buffer state definition, each cell triggers signaling to a predefined coordination group X in the following way:
If the State changes from 0 into 3 OR the State changes from 1 into 3 OR the State changes from 2 into 3,
gNB sends the coordination cell group X an activation indication of static duplex
else if the State changes from 3 to the other States (i.e., 0 OR 1 OR 2)
gNB sends target cell group X a deactivation indication of static duplex
else (i.e., no state changes from previous TTI)
no signaling In certain embodiments, the coordination cell group may be defined as a group of cells which communicate via the indication signaling and operate the same algorithm of joint direction scheduling based on the signaled information. Note that there may be a delay between a network node 115 sending the message (e.g., at time T) and another network node 115 receiving the message (e.g., at time T+delta).

According to certain embodiments, when the signal is received, the direction scheduling is conducted by choosing a duplex mode selection. For example, Nact may be defined as the number of cells which last sent a coordination signal including an activation indication. Conversely, Ndeact may be defined as the number of cells which the last sent a coordination signal including a deactivation indication. In a particular embodiment, based on Nact and Ndeact, each cell runs at a given TTI the following algorithm to adaptively switch between static duplex and flexible duplex mode:
if no signals received from cell group X at current TTI,
    if current state is State 3, gNB applies a static duplex
    else, gNB applies a flexible duplex
else
    if current State is 1 or 2 AND if Nact−Ndeact<=Nthr,
        gNB applies flexible duplex (i.e., always transmits)
    else
        gNB applies static duplex With 1 bit signaling, cross-link interference cannot be avoided when neighboring cells are in State 1 or 2. For example, gNB1 has downlink traffic only while gNB2 has uplink traffic. In this case, 1 bit signaling based on state change to 3 is not enough although cross-link interference from single but opposite direction of traffic exists. To address this case, 2 bit backhaul signaling for joint direction scheduling may be used, in certain embodiments, in order to provide additional direction information. In a particular embodiment, for example, the signaling may be triggered as follows:
If there is any change in buffer state
    gNB sends to the coordination cell group X with a 2 bit buffer state information directly (e.g., DL:00, UL:01, DL+UL:10)
else (i.e., no state change)
    no signaling Based on the received buffer state information, each cell may run a direction selection algorithm by considering its own local buffer state. In a particular embodiment, for example, N_dl may be defined as the number of cells for which the last received signal is DL state. N_ul may be defined as the number of cells for which the last received signal is UL state. N_dlul may be defined as the number of cells for which the last received signal is DLUL state. In a particular example embodiment, the following direction scheduling algorithm may be applied:
if no signals are received from cell group X at current TTI,
    if current state is State 3, gNB applies a static duplex
    else, gNB applies a flexible duplex
else
    If current State is 1
        If Nul>Ndl_thr, gNB applies static duplex
        Else, gNB applies flexible duplex
    Else if current State is 2
        If Ndl>Nul_thr, gNB applies static duplex
        Else, gNB applies flexible duplex
    Else (current State is 3)
        gNB applies static duplex In certain embodiments, the above described techniques may be further extended to consider different traffic types at a given cell. For example, according to a particular embodiment, each gNB may signal a traffic type (e.g. URLLC, eMBB, . . . ) in addition to the above-described information. Then, in each cell, traffic direction for a slot may be determined based on what the majority of URLLC nodes need. More specifically, the threshold used in the direction selection algorithms such as Nthr, Ndl_thr, or Nul_thr may be based on the signaling received from URLLC nodes. In certain embodiments, a different weighting may be applied to URLLC nodes compared to eMBB nodes in computing the values of Nthr, Ndl_thr and Nul_thr. In still other certain embodiments, a joint scheduler may not only take QoS parameters into account but also take the cross-link interference generated by the scheduler choice across multiple cells into account in deciding the traffic direction.

Figure 4:
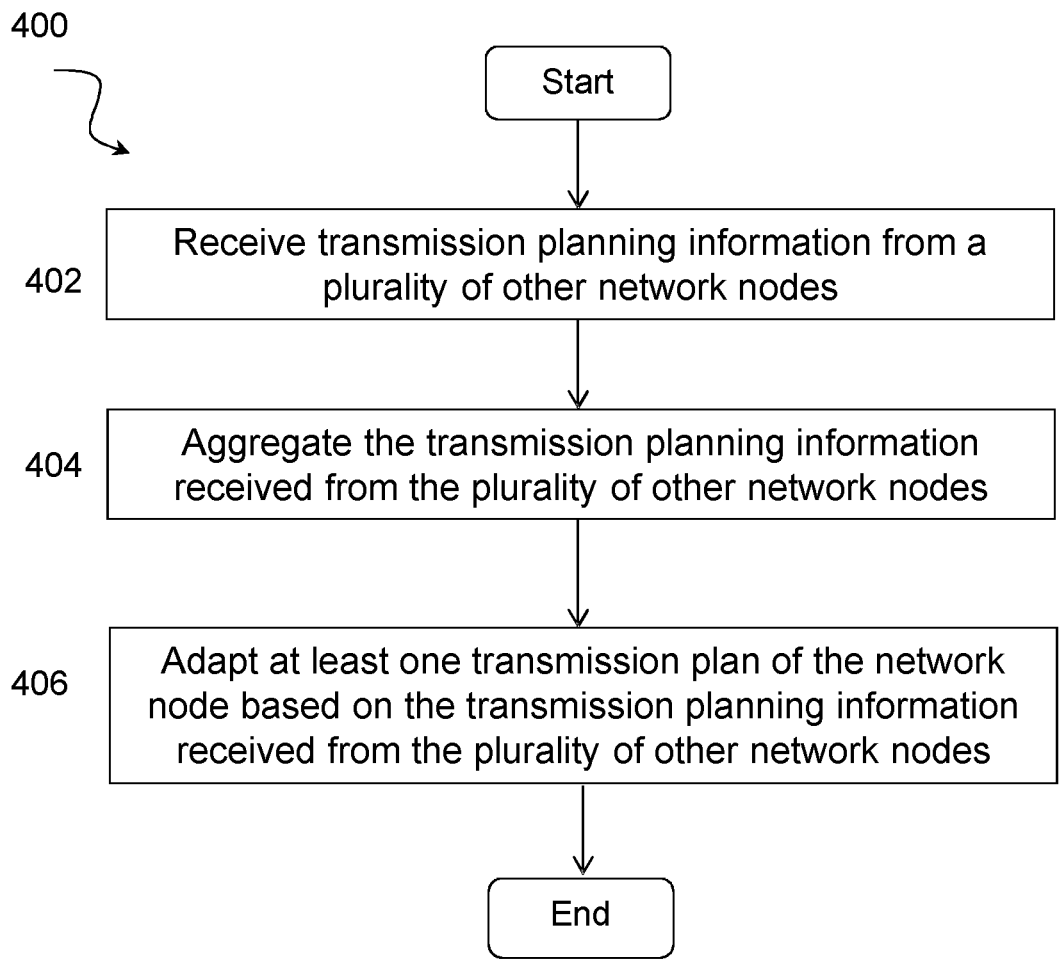
FIG. 4 is a flow diagram of a method in a network node, in accordance with certain embodiments.

FIG. 4 is a flow diagram of a method 400 in a network node 115, in accordance with certain embodiments. In certain embodiments, network node 115 may include an eNodeB, a gNB, a transmission-receive point, or an access point. The method may begin at step 402 when the network node 115 receiving transmission planning information from a plurality of other network nodes.

In certain embodiments, the transmission planning information received from the plurality of network nodes is related to a respective buffer state of each of the plurality of network nodes. In a particular embodiment, for example, each respective buffer state may include one of: a first state where both a downlink buffer and an uplink buffer are empty, a second state where the downlink buffer is not empty and an uplink buffer is empty, a third state where the downlink buffer is empty and the uplink buffer is not empty, and a fourth state where the downlink buffer is not empty and an uplink buffer is not empty. In a particular embodiment, the fourth state may be further divided into sub-states, including: a first sub-state wherein there is no preference to a downlink to uplink transmission ratio, a second sub-state where there is a preference of a high downlink to uplink transmission ratio, and a third sub-state where there is a preference of a low downlink to uplink transmission ratio.

In certain embodiments, if the transmission planning information indicates a state change from any one of the first state, the second state, and the third state to the fourth state, the method further includes transmitting an activation indication of static duplex. Alternatively, if the transmission planning information indicates a state change from the fourth state to any one of the first state, the second state, or the third state, the method may further include transmitting a deactivation indication of static duplex.

In certain other embodiments, the transmission planning information received from the plurality of network nodes 115 may be related to a respective traffic pattern of each of the plurality of network nodes. For example, the respective traffic pattern may include planned future transmissions or predicted transmissions.

In still other embodiments, the transmission planning information received from the plurality of network nodes may be related to a respective a downlink to uplink traffic ratio expected over a fixed number of upcoming subframes for each of the plurality of network nodes.

In still other embodiments, the transmission planning information may be conveyed in terms of a number of total bits to be delivered in both an uplink direction and a downlink direction. Alternatively, the transmission planning information may be conveyed in terms of a number of fixed higher layer packets to be delivered.

At step 404, network node 115 aggregates the transmission planning information received from the plurality of network nodes. In certain embodiments, aggregating the information may include identifying, for each of the plurality of network nodes, a type associated with the transmission planning information received and counting a number of received information of each type. In a particular embodiment, for example, a windowed count of the received transmission planning information may be performed. In certain other embodiments, at least one exponential forgetting factor may be applied on a previous count of the received transmission planning information.

At step 406, network node 115 adapts at least one transmission plan of the network node based on the transmission planning information received from the plurality of other network nodes.

In certain embodiments, no signals may be received during a transmission time interval. In such a case, adapting the at least one transmission plan may include applying a static duplex if a current state is the fourth state. Alternatively, if the current state is the first state, the second state, or the second state, a flexible duplex may be applied.

In certain other embodiments, signals may be received during a transmission time interval. In such a case, adapting the at least one transmission plan may include applying flexible duplex if 1) a current state is state two or state three and 2) a number of activation indications minus a number of deactivation indications is less than or equal to a threshold value. Conversely, static duplex may be applied if 1) the current state is state is state one or state four or 2) the number of activation indication minus the number of deactivation indications is greater than the threshold value.

In certain other embodiments, it may be determined that no signals were received from a first cell group during a transmission time interval. In such a case, adapting the at least one transmission plan may include applying a static duplex if a current state is the fourth state and applying a flexible duplex if the current state is any one of the first state, the second state, and the third state.

In certain other embodiments, it may be determined that signals were received from a first cell group during a transmission time interval. In such a case, adapting the at least one transmission plan may include applying static duplex if 1) a current state is the second state and 2) a number of cells that indicated a buffer status of an uplink state is greater than a downlink state threshold. Conversely, flexible duplex may be applied if 1) the current state is any one of the first state, the third state, or the fourth state and 2) the number of cells that indicated a buffer status of the uplink state is less than or equal to a downlink state threshold. Static duplex may also be applied if 1) the current state is the third state and 2) a number of cells that indicated a buffer status of a downlink state is greater than an uplink state threshold. Conversely, flexible duplex may be applied if 1) the current state is the third state and 2) the number of cells that indicated a buffer status of a downlink state is less than or equal to the uplink state threshold. Where the current state is the fourth state, static duplex may also be applied.

In certain embodiments, adapting the at least one transmission plan of the network node may include switching from at least one transmission mode, such as, for example, from a first mode to a second node. In a particular embodiment, the first mode may include a static duplex mode and the second mode includes a flexible duplex mode and network node 115 may switch from static to flexible duplex mode. In another particular embodiment, the network node may switch from flexible to static duplex mode.

In certain embodiments, each of the first mode and the second mode may be independently selected from the following:
  a static duplex mode with equal downlink to uplink transmission ratio;
  a static duplex mode with high downlink to uplink transmission ratio;
  a static duplex mode with low downlink to uplink transmission ratio; and
  a flexible duplex mode.

Figure 5:
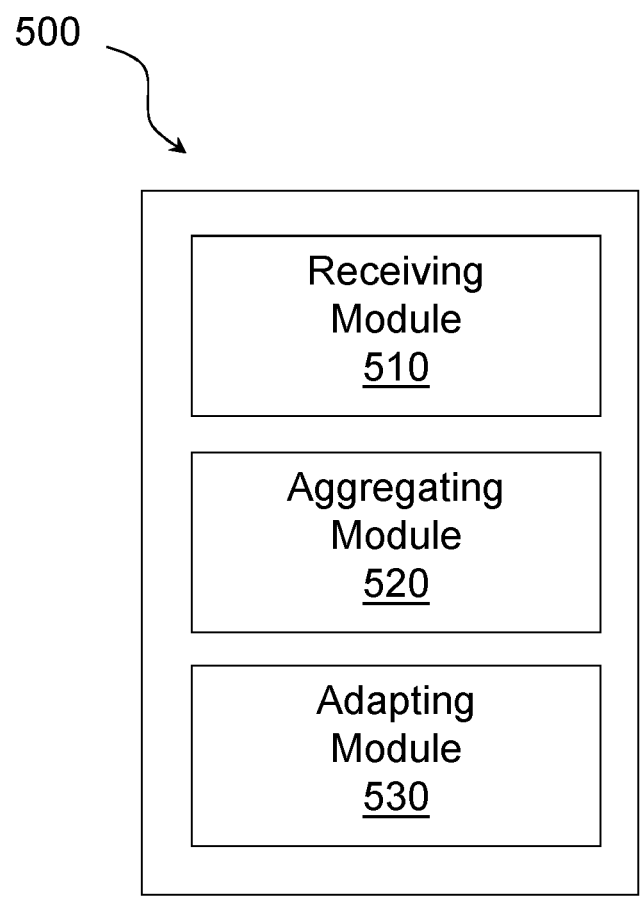
FIG. 5 is a block schematic of an exemplary virtual computing device, in accordance with certain embodiments.

In certain embodiments, the method for distributed coordination of duplex directions as described above may be performed by a computer networking virtual apparatus. FIG. 5 illustrates an example virtual computing device 500 for distributed coordination of duplex directions, according to certain embodiments. In certain embodiments, virtual computing device 500 may include modules for performing steps similar to those described above with regard to the method illustrated and described in FIG. 5. For example, virtual computing device 500 may include a receiving module 510, an aggregating module 520, an adapting module 530, and any other suitable modules for distributed coordination of duplex directions. In certain embodiments, the one or more of the modules may be implemented using processing circuitry 320 of FIG. 3. In certain embodiments, the functions of two or more of the various modules may be combined into a single module.

The receiving module 510 may perform the receiving functions of virtual computing device 500. For example, in a particular embodiment, receiving module 510 may receive transmission planning information from a plurality of other network nodes. In certain embodiments, the transmission planning information may be related to at least one of a buffer state information, state change information, traffic pattern information, and downlink to uplink traffic ratio information.

The aggregating module 520 may perform the aggregating functions of virtual computing device 500. For example, in a particular embodiment, aggregating module 520 may aggregate the transmission planning information received from the plurality of network nodes 115. In certain embodiments, aggregating the information may include identifying, for each of the plurality of network nodes, a type associated with the transmission planning information received and counting a number of received information of each type.

The adapting module 530 may perform the adapting functions of virtual computing device 500. For example, in a particular embodiment, adapting module 530 may adapt at least one transmission plan of the network node based on the transmission planning information received from the plurality of other network nodes. For example, a transmission plan of the network node may be switched from a static duplex mode to flexible duplex mode or vice versa.

Other embodiments of virtual computing device 500 may include additional components beyond those shown in FIG. 5 that may be responsible for providing certain aspects of the network node's functionality, including any of the functionality described above and/or any additional functionality (including any functionality necessary to support the solutions described above). The various different types of network node 115 may include components having the same physical hardware but configured (e.g., via programming) to support different radio access technologies, or may represent partly or entirely different physical components.

Figure 6:
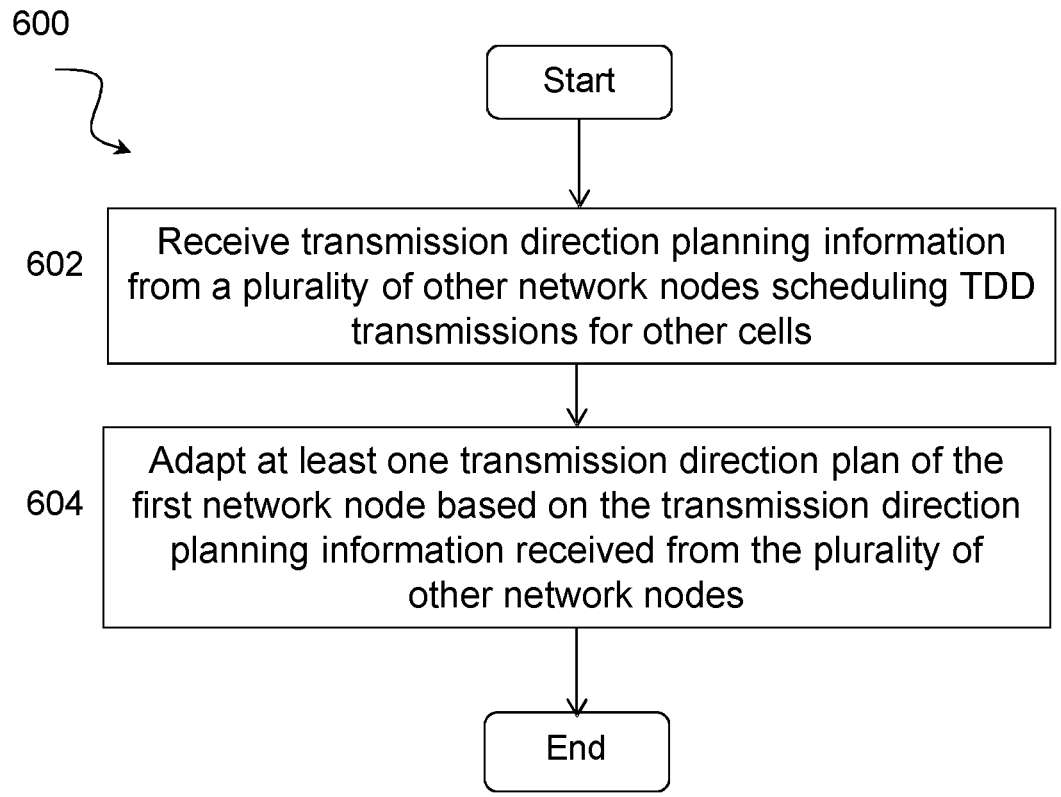
FIG. 6 is a flow diagram of another method in a network node, in accordance with certain embodiments.

FIG. 6 is a flow diagram of another method 600 in a first network node 115 scheduling TDD transmissions for a first cell, in accordance with certain embodiments. In certain embodiments, first network node 115 may include an eNodeB, a gNB, a transmission-receive point, or an access point. The method may begin at step 602 when the first network node 115 receives transmission direction planning information from a plurality of other network nodes scheduling TDD transmissions for other cells. In a particular embodiment, the transmission direction planning information may be received in a compressed format.

According to certain embodiments, the transmission direction planning information may include scheduling information related to an uplink or a downlink direction. Additionally or alternatively, the transmission direction planning information may be related to a respective buffer state of each of the other network nodes. In a particular embodiment, for example, each respective buffer state of the other network nodes may include one of:
 a first state where both a downlink buffer and an uplink buffer are empty,
 a second state where the downlink buffer is not empty and an uplink buffer is empty,
 a third state where the downlink buffer is empty and the uplink buffer is not empty, and
 a fourth state where the downlink buffer is not empty and an uplink buffer is not empty.

In a particular embodiment, the fourth state may be further divided into sub-states, including:
 a first sub-state wherein there is no preference to a downlink to uplink transmission ratio,
 a second sub-state where there is a preference of a high downlink to uplink transmission ratio, and
 a third sub-state where there is a preference of a low downlink to uplink transmission ratio.

According to certain embodiments, if the transmission direction planning information indicates a state change from any one of the first state, the second state, and the third state to the fourth state, the method may further include the first network node 115 transmitting an activation indication of static duplex. Alternatively, if the transmission direction planning information indicates a state change from the fourth state to any one of the first state, the second state, or the third state, the method may further include the first network node 115 transmitting a deactivation indication of static duplex.

According to certain other embodiments, the transmission direction planning information received from the plurality of network nodes 115 may be related to a respective traffic direction pattern of each of the plurality of network nodes. For example, the respective traffic direction pattern may include planned future transmissions or predicted transmissions.

In still other embodiments, the transmission direction planning information received from the plurality of network nodes may be related to a respective a downlink to uplink traffic ratio expected over a fixed number of upcoming subframes for each of the plurality of network nodes.

In still other embodiments, the transmission direction planning information may be conveyed in terms of a number of total bits to be delivered in an uplink direction or a downlink direction. Alternatively, the transmission direction planning information may be conveyed in terms of a number of fixed higher layer packets to be delivered.

According to a particular embodiment, the transmission direction planning information may be related to a respective traffic type of each of the plurality of network nodes.

According to a particular embodiment, in addition to receiving transmission direction planning from the other network nodes, the first network node 115 may transmit its own transmission direction planning information to the other network nodes. Additionally or alternatively, if the transmission direction planning information indicates any change in buffer state, first network node 115 may adapt the transmission direction plan by transmitting, to a coordination cell group, 2 bit buffer state direction information directly.

At step 604, first network node 115 adapts at least one transmission direction plan of the first network node 115 based on the transmission direction planning information received from the plurality of other network nodes. The transmission direction plan may define which TDD mode to be used by the first cell during at least one upcoming transmission time interval.

In certain embodiments, first network node 115 may determine if signals were received during a transmission time interval. In one particular embodiment, if no signals are received during a transmission time interval, first network node 115 may adapt the at least one transmission direction plan by applying static duplex if a current state is the fourth state. Conversely, first network node 115 may apply flexible duplex if the current state is the first state, the second state, or the second state.

In another particular embodiment where signals are received during the transmission time interval, first network node 115 may adapt the at least one transmission direction plan by applying flexible duplex if 1) a current state is state two or state three and 2) a number of activation indications minus a number of deactivation indications is less than or equal to a threshold value. Conversely, first network node 115 may apply static duplex if 1) the current state is state is state one or state four or 2) the number of activation indication minus the number of deactivation indications is greater than the threshold value.

In yet another particular embodiment where no signals were received from a first cell group during the transmission time interval, first network node 115 may adapt the at least one transmission direction plan by applying static duplex if a current state is the fourth state or applying flexible duplex if the current state is any one of the first state, the second state, and the third state.

In still yet another particular embodiment where signals are received from a first cell group during the transmission time interval, first network node 115 may adapt the at least one transmission direction plan by applying static duplex if:
  a current state is the second state and a number of cells for which a last received signal is an uplink state is greater than a downlink state threshold;
  the current state is the third state and the number of cells for which the last received signal is the downlink state is greater than an uplink state threshold; or
  the current state is the fourth state.
Conversely, first network node 115 may apply flexible duplex if:
  the current state is the second state and the number of cells for which the last received signal is the uplink state is less than or equal to a downlink state threshold; or
  the current state is the third state and the number of cells that indicated a buffer status of a downlink state is less than or equal to the uplink state threshold.

In certain embodiments, adapting the at least one transmission direction plan of the first network node may include switching from a first mode to a second node. In a particular embodiment, the first mode may include a static duplex mode and the second mode includes a flexible duplex mode. Conversely, the first mode may include a flexible duplex mode and the second mode may include a static duplex mode. In another particular embodiment, each of the first mode and the second mode may be independently selected from the following:
  a static duplex mode with equal downlink to uplink transmission ratio;
  a static duplex mode with high downlink to uplink transmission ratio;
  a static duplex mode with low downlink to uplink transmission ratio; and
  a flexible duplex mode.

According to certain embodiments, first network node 115 may also aggregate the transmission planning information received from the plurality of network nodes prior to adapting the transmission direction plan. In a particular embodiment, for example, first network node 115 may identify, for each of the plurality of network nodes, a type associated with the transmission direction planning information received and count a number of received information of each type. In a particular embodiment, for example, a windowed count of the received transmission direction planning information may be performed. In certain other embodiments, at least one exponential forgetting factor may be applied on a previous count of the received transmission direction planning information.

Figure 7:
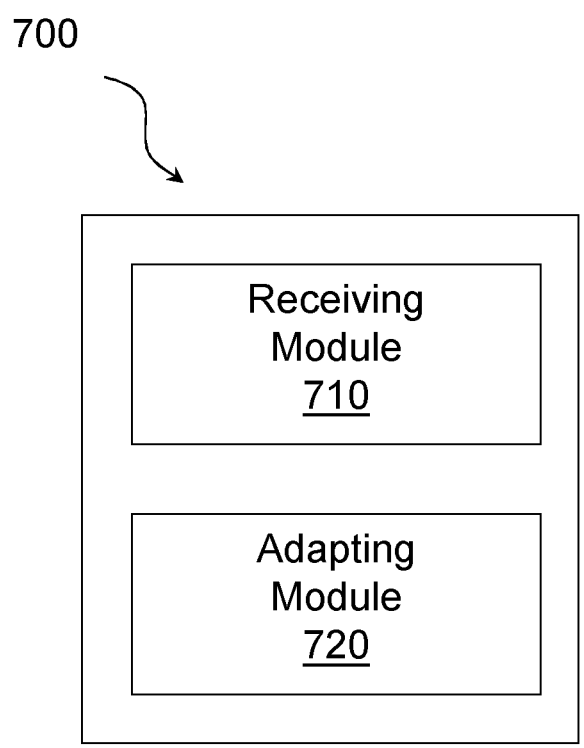
FIG. 7 is a block schematic of another exemplary virtual computing device, in accordance with certain embodiments.

In certain embodiments, the method for distributed coordination of duplex directions as described above may be performed by a computer networking virtual apparatus. FIG. 7 illustrates another example virtual computing device 700 for distributed coordination of duplex directions, according to certain embodiments. In certain embodiments, virtual computing device 700 may include modules for performing steps similar to those described above with regard to the method illustrated and described in FIG. 6. For example, virtual computing device 700 may include a receiving module 710, an adapting module 720, and any other suitable modules for distributed coordination of duplex directions. In certain embodiments, the one or more of the modules may be implemented using processing circuitry 320 of FIG. 3. In certain embodiments, the functions of two or more of the various modules may be combined into a single module.

The receiving module 710 may perform the receiving functions of virtual computing device 700. For example, in a particular embodiment, receiving module 710 may receive transmission direction planning information from a plurality of other network nodes scheduling TDD transmissions for other cells. In certain embodiments, the transmission direction planning information may be related to at least one of a buffer state information, state change information, traffic pattern information, and downlink to uplink traffic ratio information.

The adapting module 720 may perform the adapting functions of virtual computing device 700. For example, in a particular embodiment, adapting module 720 may adapt at least one transmission plan of a first network node 115 based on the transmission direction planning information received from the plurality of other network nodes. For example, a transmission plan of the first network node 115 may be switched from a static duplex mode to flexible duplex mode or vice versa.

Other embodiments of virtual computing device 700 may include additional components beyond those shown in FIG. 7 that may be responsible for providing certain aspects of the first network node's functionality, including any of the functionality described above and/or any additional functionality (including any functionality necessary to support the solutions described above). The various different types of network node 115 may include components having the same physical hardware but configured (e.g., via programming) to support different radio access technologies, or may represent partly or entirely different physical components.

Figure 8:
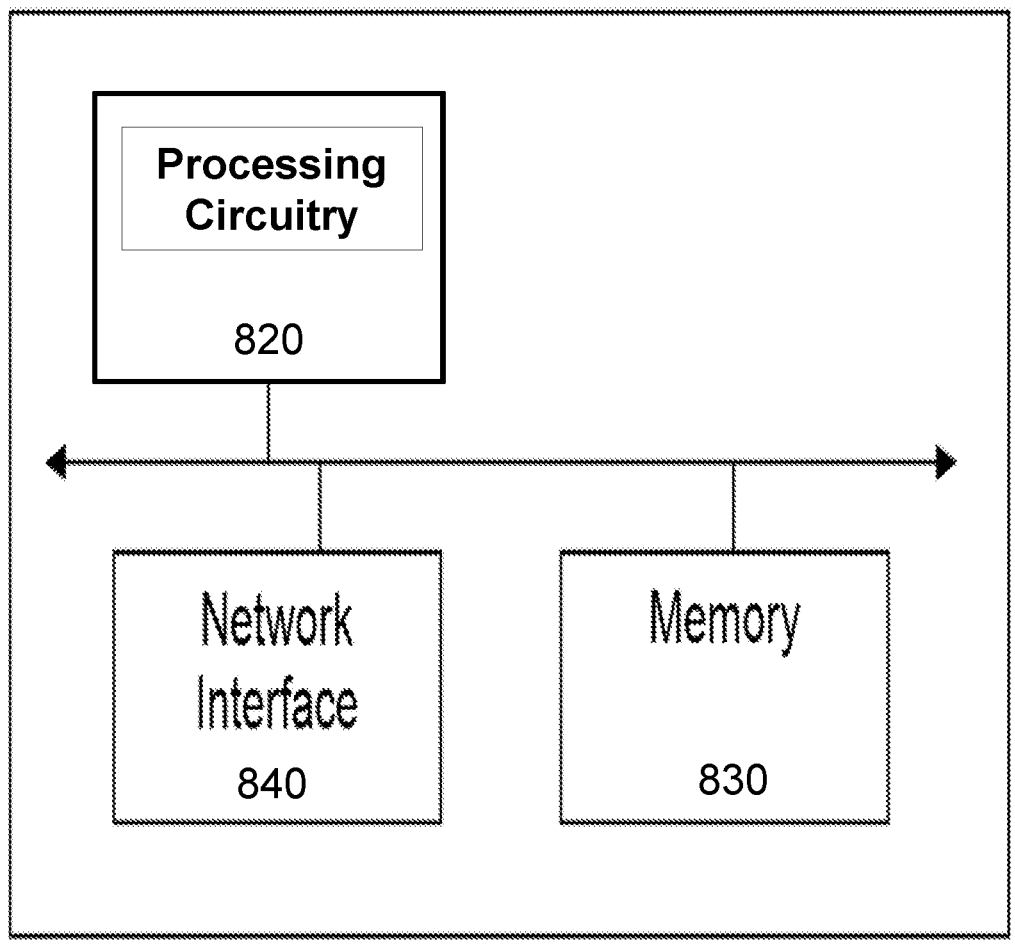
FIG. 8 is a block schematic of an exemplary radio network controller or core network node, in accordance with certain embodiments.

FIG. 8 is a block schematic of an exemplary radio network controller or core network node 120, 130, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 120, 130 includes processing circuitry 820, memory 830, and network interface 840. In some embodiments, processing circuitry 820 executes instructions to provide some or all of the functionality described above as being provided by the network node, memory 830 stores the instructions executed by processing circuitry 820, and network interface 840 communicates signals to any suitable node, such as a gateway, switch, router, Internet, Public Switched Telephone Network (PSTN), network nodes 115, radio network controllers or core network nodes 120, 130, etc.

Processing circuitry 820 may include any suitable combination of hardware and software implemented in one or more modules to execute instructions and manipulate data to perform some or all of the described functions of the radio network controller or core network node 120, 130. In some embodiments, processing circuitry 820 may include, for example, one or more computers, one or more central processing units (CPUs), one or more microprocessors, one or more applications, and/or other logic.

Memory 830 is generally operable to store instructions, such as a computer program, software, an application including one or more of logic, rules, algorithms, code, tables, etc. and/or other instructions capable of being executed by a processor. Examples of memory 830 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 840 is communicatively coupled to processing circuitry 820 and may refer to any suitable device operable to receive input for the network node, send output from the network node, perform suitable processing of the input or output or both, communicate to other devices, or any combination of the preceding. Network interface 840 may include appropriate hardware (e.g., port, modem, network interface card, etc.) and software, including protocol conversion and data processing capabilities, to communicate through a network.

Other embodiments of the network node may include additional components beyond those shown in FIG. 8 that may be responsible for providing certain aspects of the network node's functionality, including any of the functionality described above and/or any additional functionality (including any functionality necessary to support the solution described above).

Figure 9:
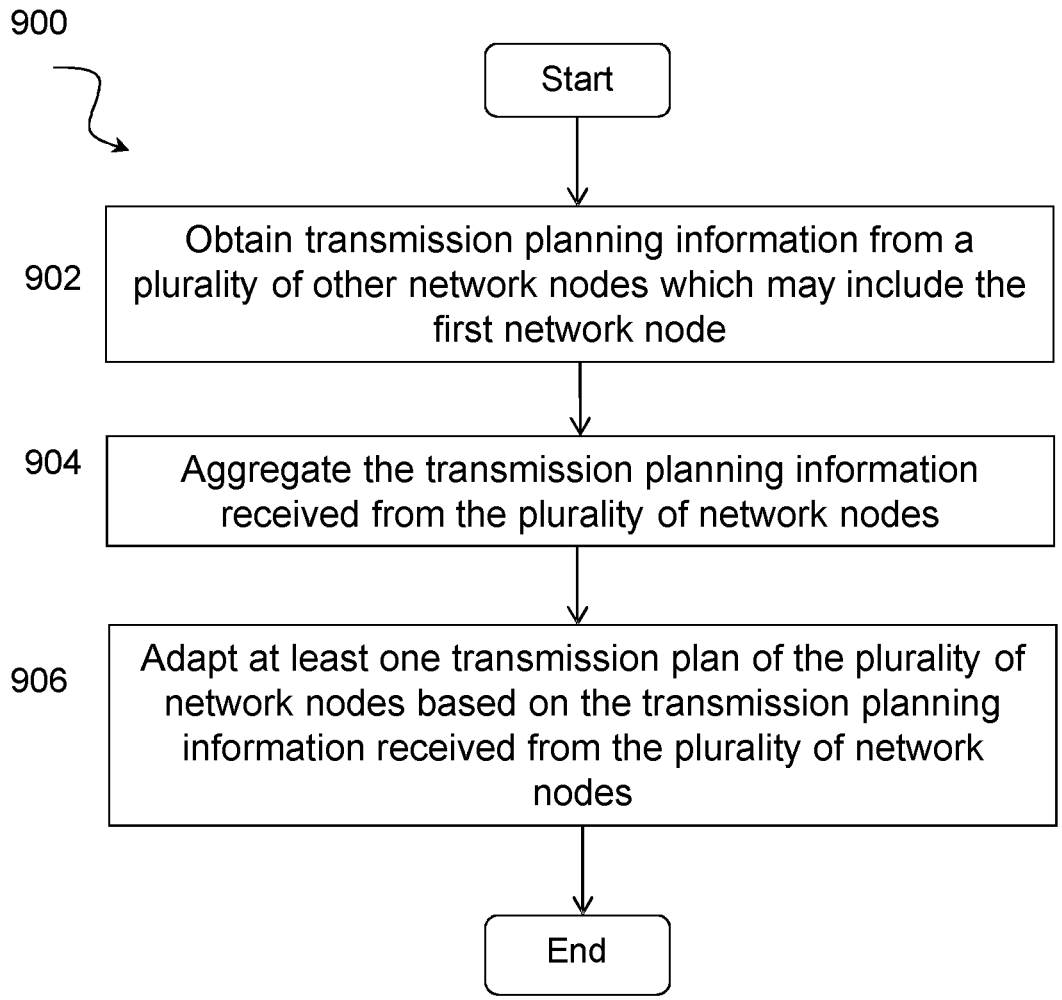
FIG. 9 is a flow diagram of a method in a radio network controller or core network node, in accordance with certain embodiments.

FIG. 9 is a flow diagram of a method 900 in a radio network controller 120 or core network node 130, in accordance with certain embodiments. The method may begin at step 902 when the radio network controller 120 or core network node 130 obtains transmission planning information from a plurality of network nodes which could include the radio network controller 120 or core network node 130. At step 904, radio network controller 120 or core network node 130 aggregates the transmission planning information received from the plurality of network nodes. At step 904, radio network controller 120 or core network node 130 adapts at least one transmission plan of at least one of the network nodes based on the transmission planning information received from the other network nodes. The transmission direction plan may define which TDD mode to be used by the first cell during at least one upcoming transmission time interval.

Figure 10:
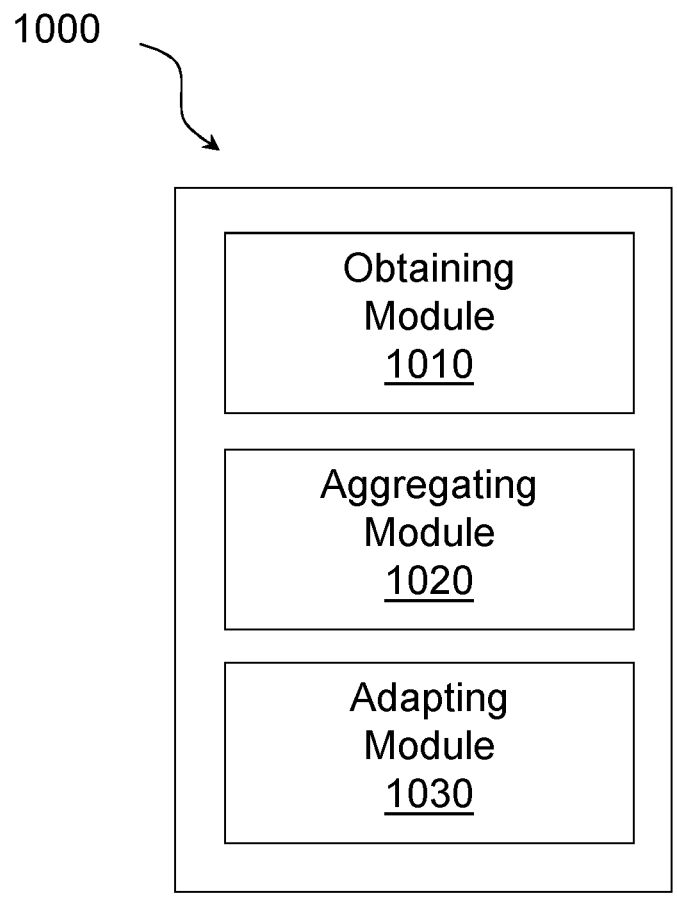
FIG. 10 is a block schematic of another exemplary virtual computing device, in accordance with certain embodiments.

In certain embodiments, the method for distributed coordination of duplex directions as described above may be performed by a computer networking virtual apparatus. FIG. 10 illustrates another example virtual computing device 1000 for distributed coordination of duplex directions, according to certain embodiments. In certain embodiments, virtual computing device 1000 may include modules for performing steps similar to those described above with regard to the method illustrated and described in FIG. 9. For example, virtual computing device 1000 may include an obtaining module 1010, an aggregating module 1020, an adapting module 1030, and any other suitable modules for distributed coordination of duplex directions. In certain embodiments, the one or more of the modules may be implemented using processing circuitry 820 of FIG. 8. In certain embodiments, the functions of two or more of the various modules may be combined into a single module. The obtaining module 1010 may perform the obtaining functions of virtual computing device 1000. For example, in a particular embodiment, obtaining module 1010 may obtain transmission planning information from a plurality of other network nodes which could include the radio network controller 120 or core network node 130. In certain embodiments, the transmission planning information may be related to at least one of a buffer state information, state change information, traffic pattern information, and downlink to uplink traffic ratio information.

The aggregating module 1020 may perform the aggregating functions of virtual computing device 1000. For example, in a particular embodiment, aggregating module 1020 may aggregate the transmission planning information received from the plurality of network nodes.

The adapting module 1030 may perform the adapting functions of virtual computing device 1000. For example, in a particular embodiment, adapting module 1030 may adapt at least one transmission plan of at least one of the plurality of network nodes based on the transmission planning information received from the plurality of network nodes. For example, a transmission plan of a network node 115 may be switched from a static duplex mode to flexible duplex mode or vice versa.

Other embodiments of virtual computing device 1000 may include additional components beyond those shown in FIG. 10 that may be responsible for providing certain aspects of the radio network controller or core network node's functionality, including any of the functionality described above and/or any additional functionality (including any functionality necessary to support the solutions described above). The various different types of radio network controllers and core network nodes may include components having the same physical hardware but configured (e.g., via programming) to support different radio access technologies, or may represent partly or entirely different physical components.

Figure 11:
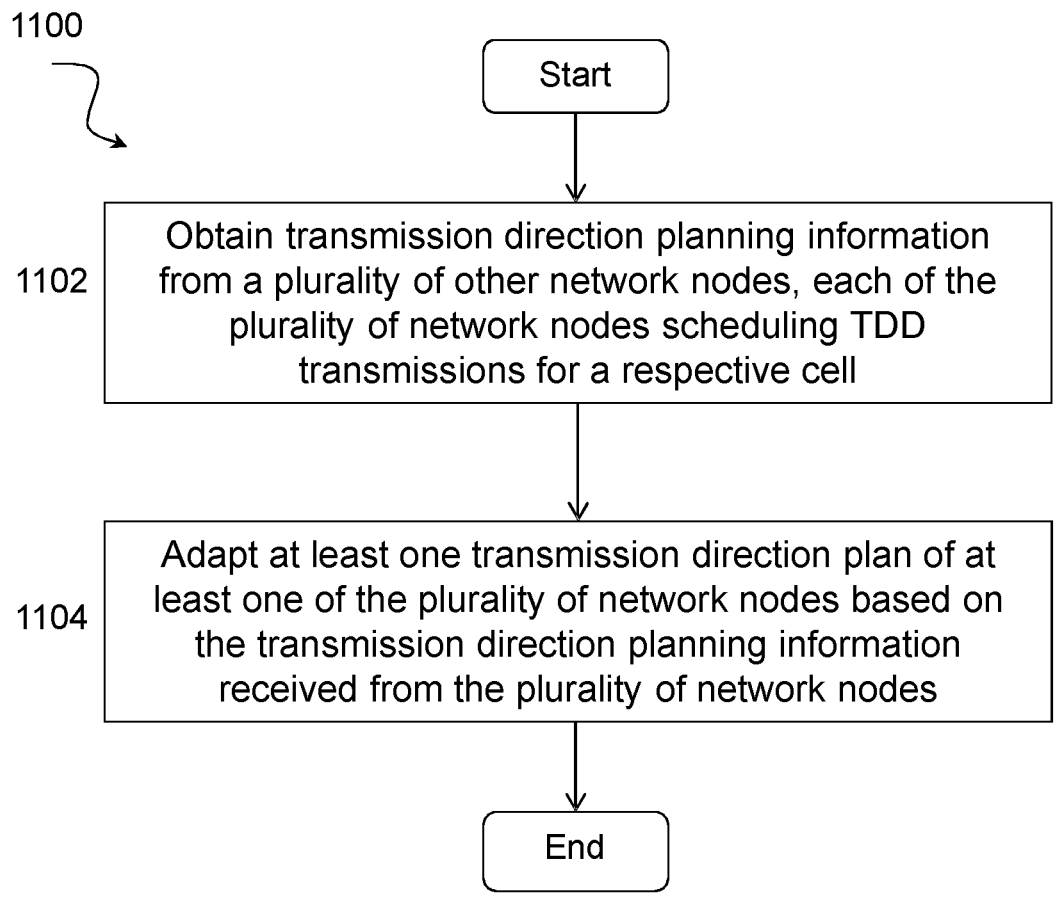
FIG. 11 is a flow diagram of another method in a radio network controller or core network node, in accordance with certain embodiments.

FIG. 11 is a flow diagram of a method 1100 in a radio network controller 120 or core network node 130, in accordance with certain embodiments. The method may begin at step 1102 when the radio network controller 120 or core network node 130 obtains transmission direction planning information from a plurality of other network nodes which could include the radio network controller 120 or core network node 130. According to certain embodiments, each of the plurality of network nodes is scheduling TDD transmissions for a respective cell.

At step 1104, radio network controller 120 or core network node 130 adapts at least one transmission direction plan of at least one of the network nodes based on the transmission direction planning information received from the other network nodes.

Figure 12:
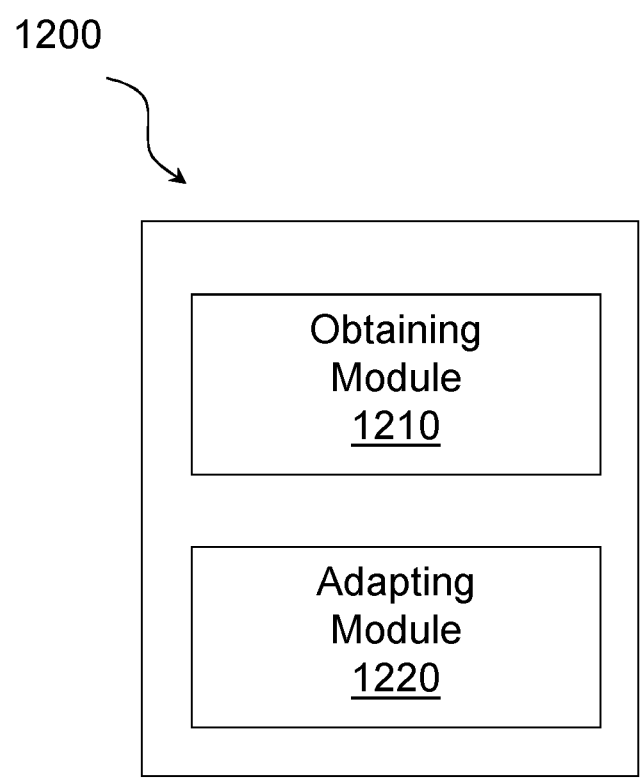
FIG. 12 is a block schematic of another exemplary virtual computing device, in accordance with certain embodiments.

In certain embodiments, the method for distributed coordination of duplex directions as described above may be performed by a computer networking virtual apparatus. FIG. 12 illustrates another example virtual computing device 1200 for distributed coordination of duplex directions, according to certain embodiments. In certain embodiments, virtual computing device 1200 may include modules for performing steps similar to those described above with regard to the method illustrated and described in FIG. 11. For example, virtual computing device 1200 may include an obtaining module 1210, an adapting module 1220, and any other suitable modules for distributed coordination of duplex directions. In certain embodiments, the one or more of the modules may be implemented using processing circuitry 820 of FIG. 8. In certain embodiments, the functions of two or more of the various modules may be combined into a single module.

The obtaining module 1210 may perform the obtaining functions of virtual computing device 1200. For example, in a particular embodiment, obtaining module 1210 may obtain transmission direction planning information from a plurality of other network nodes which could include the radio network controller 120 or core network node 130. In certain embodiments, the transmission direction planning information may be related to at least one of a buffer state information, state change information, traffic pattern information, and downlink to uplink traffic ratio information.

The adapting module 1220 may perform the adapting functions of virtual computing device 1200. For example, in a particular embodiment, adapting module 1220 may adapt at least one transmission direction plan of at least one of the plurality of network nodes based on the transmission direction planning information received from the plurality of network nodes. For example, a transmission plan of a network node 115 may be switched from a static duplex mode to flexible duplex mode or vice versa.

Other embodiments of virtual computing device 1200 may include additional components beyond those shown in FIG. 12 that may be responsible for providing certain aspects of the radio network controller or core network node's functionality, including any of the functionality described above and/or any additional functionality (including any functionality necessary to support the solutions described above). The various different types of radio network controllers and core network nodes may include components having the same physical hardware but configured (e.g., via programming) to support different radio access technologies, or may represent partly or entirely different physical components.

According to one example embodiment, a method in a network node is disclosed. The method includes:
  receiving transmission planning information from a plurality of other network nodes;
  aggregating the transmission planning information received from the plurality of network nodes;
  adapting at least one transmission plan of the network node based on the transmission planning information received from the plurality of other network nodes;
  optionally, the network node comprises one of:
    an eNodeB;
    a gNB;
    a transmission-receive point; and
    an access point;
  optionally, the method further includes transmitting transmission planning information associated with the network node to the plurality of other network nodes;
  optionally, the transmission planning information received from the plurality of network nodes is related to a respective buffer state of each of the plurality of network nodes;
  optionally, the respective buffer state of each of the plurality of network nodes may be selected from the group consisting of:
    a first state where both a downlink buffer and an uplink buffer are empty;
    a second state where the downlink buffer is not empty and an uplink buffer is empty;
    a third state where the downlink buffer is empty and the uplink buffer is not empty; and
    a fourth state where the downlink buffer is not empty and an uplink buffer is not empty;
  optionally, the fourth state may be further selected from a plurality of sub-states selected from the group consisting of:
    a first sub-state wherein there is no preference to a downlink to uplink transmission ratio;
    a second sub-state where there is a preference of a high downlink to uplink transmission ratio; and
    a third sub-state where there is a preference of a low downlink to uplink transmission ratio;
  optionally, if the transmission planning information indicates a state change from any one of the first state, the second state, and the third state to the fourth state, the method further includes transmitting an activation indication of static duplex;
  optionally, if the transmission planning information indicates a state change from the fourth state to any one of the first state, the second state, or the third state, the method further includes transmitting a deactivation indication of static duplex;
  optionally, no signals are received during a transmission time interval, and adapting the at least one transmission plan comprises:
    if a current state is the fourth state, applying a static duplex; and
    if the current state is the first state, the second state, or the second state, applying a flexible duplex;
  optionally, the signals are received during a transmission time interval, and adapting the at least one transmission plan comprises:
    if a current state is state two or state three and if a number of activation indications minus a number of deactivation indications is less than or equal to a threshold value, applying flexible duplex; and
    if the current state is state is state one or state four or if the number of activation indication minus the number of deactivation indications is greater than the threshold value, applying static duplex.
  optionally, the method further includes determining that no signals were received from a first cell group during a transmission time interval, and adapting the at least one transmission plan comprises:
    applying a static duplex if a current state is the fourth state, applying a static duplex; and
    applying a flexible duplex if the current state is any one of the first state, the second state, and the third state.
  optionally, the method further includes determining that signals were received from a first cell group during a transmission time interval, and adapting the at least one transmission plan comprises:

applying static duplex if a current state is the second state and a number of cells that indicated a buffer status of an uplink state is greater than a downlink state threshold;

applying flexible if the current state is any one of the first state, the third state, or the fourth state and the number of cells that indicated a buffer status of the uplink state is less than or equal to a downlink state threshold;

applying static duplex if the current state is the third state and a number of cells that indicated a buffer status of a downlink state is greater than an uplink state threshold;

applying flexible duplex if the current state is the third state and the number of cells that indicated a buffer status of a downlink state is less than or equal to the uplink state threshold; and applying a static duplex if the current state is the fourth state;

optionally, the transmission planning information received from the plurality of network nodes is related to a respective traffic pattern of each of the plurality of network nodes;

optionally, the respective traffic pattern comprises planned future transmission or predicted transmissions;

optionally, the transmission planning information received from the plurality of network nodes is related to a respective a downlink to uplink traffic ratio expected over a fixed number of upcoming subframes for each of the plurality of network nodes;

optionally, the transmission planning information is conveyed in terms of a number of total bits to be delivered in both an uplink direction and a downlink direction;

optionally, the transmission planning information is conveyed in terms of a number of fixed higher layer packets to be delivered;

optionally, the transmission planning information is received in a compressed format;

optionally, aggregating the transmission planning information comprises:
  identifying, for each of the plurality of network nodes, a type associated with the transmission planning information received; and
  counting a number of received information of each type;

optionally, aggregating the transmission planning information comprises performing a windowed count of the received transmission planning information;

optionally, aggregating the transmission planning information comprises applying at least one exponential forgetting factor on a previous count of the received transmission planning information;

optionally, adapting the at least one transmission plan of the network node comprises switching from at least one transmission mode;

optionally, adapting the at least one transmission plan of the network node comprises switching between a first mode and a second mode;

optionally, the first mode comprises a static duplex mode and the second mode comprises a flexible duplex mode;

optionally, the first mode comprises a flexible duplex mode and the second mode comprises a static duplex mode;

optionally, each of the first mode and the second mode are independently selected from the group consisting of:
  a static duplex mode with equal downlink to uplink transmission ratio;
  a static duplex mode with high downlink to uplink transmission ratio;
  a static duplex mode with low downlink to uplink transmission ratio; and
  a flexible duplex mode;

optionally, if the transmission planning information indicates any change in buffer state, adapting the at least one transmission plan comprises transmitting, to a coordination cell group, 2 bit buffer state information directly.

optionally, the transmission planning information received from the plurality of network nodes is related to a respective traffic type of each of the plurality of network nodes;

According to another example embodiment, a network node is disclosed. The network node comprises processing circuitry. The processing circuitry is configured to
  receive transmission planning information from a plurality of other network nodes;
  aggregate the transmission planning information received from the plurality of network nodes;
  adapt at least one transmission plan of the network node based on the transmission planning information received from the plurality of other network nodes;

optionally, the network node comprises one of:
  an eNodeB;
  a gNB;
  a transmission-receive point; and
  an access point;

optionally, the processing circuitry is further configured to transmit transmission planning information associated with the network node to the plurality of other network nodes;

optionally, the transmission planning information received from the plurality of network nodes is related to a respective buffer state of each of the plurality of network nodes;

optionally, the respective buffer state of each of the plurality of network nodes may be selected from the group consisting of:
  a first state where both a downlink buffer and an uplink buffer are empty;
  a second state where the downlink buffer is not empty and an uplink buffer is empty;
  a third state where the downlink buffer is empty and the uplink buffer is not empty; and
  a fourth state where the downlink buffer is not empty and an uplink buffer is not empty;

optionally, the fourth state may be further selected from a plurality of sub-states selected from the group consisting of:
  a first sub-state wherein there is no preference to a downlink to uplink transmission ratio;
  a second sub-state where there is a preference of a high downlink to uplink transmission ratio; and
  a third sub-state where there is a preference of a low downlink to uplink transmission ratio;

optionally, if the transmission planning information indicates a state change from any one of the first state, the second state, and the third state to the fourth state, the processing circuitry is further configured to transmit an activation indication of static duplex;

optionally, if the transmission planning information indicates a state change from the fourth state to any one of the first state, the second state, or the third state, the processing circuitry is further configured to transmit a deactivation indication of static duplex;

optionally, no signals are received during a transmission time interval, and adapting the at least one transmission plan comprises:
  if a current state is the fourth state, applying a static duplex; and
  if the current state is the first state, the second state, or the second state, applying a flexible duplex;
optionally, the signals are received during a transmission time interval, and adapting the at least one transmission plan comprises:
  if a current state is state two or state three and if a number of activation indications minus a number of deactivation indications is less than or equal to a threshold value, applying flexible duplex; and
  if the current state is state is state one or state four or if the number of activation indication minus the number of deactivation indications is greater than the threshold value, applying static duplex.
optionally, the processing circuitry is further configured to determine that no signals were received from a first cell group during a transmission time interval, and adapting the at least one transmission plan comprises:
  applying a static duplex if a current state is the fourth state, applying a static duplex; and
  applying a flexible duplex if the current state is any one of the first state, the second state, and the third state.
optionally, the processing circuitry is further configured to determine that signals were received from a first cell group during a transmission time interval, and adapting the at least one transmission plan comprises:
  applying static duplex if a current state is the second state and a number of cells that indicated a buffer status of an uplink state is greater than a downlink state threshold;
  applying flexible if the current state is any one of the first state, the third state, or the fourth state and the number of cells that indicated a buffer status of the uplink state is less than or equal to a downlink state threshold;
  applying static duplex if the current state is the third state and a number of cells that indicated a buffer status of a downlink state is greater than an uplink state threshold;
  applying flexible duplex if the current state is the third state and the number of cells that indicated a buffer status of a downlink state is less than or equal to the uplink state threshold; and
  applying a static duplex if the current state is the fourth state;
optionally, the transmission planning information received from the plurality of network nodes is related to a respective traffic pattern of each of the plurality of network nodes;
optionally, the respective traffic pattern comprises planned future transmission or predicted transmissions;
optionally, the transmission planning information received from the plurality of network nodes is related to a respective a downlink to uplink traffic ratio expected over a fixed number of upcoming subframes for each of the plurality of network nodes;
optionally, the transmission planning information is conveyed in terms of a number of total bits to be delivered in both an uplink direction and a downlink direction;
optionally, the transmission planning information is conveyed in terms of a number of fixed higher layer packets to be delivered;

optionally, the transmission planning information is received in a compressed format;
optionally, aggregating the transmission planning information comprises:
  identifying, for each of the plurality of network nodes, a type associated with the transmission planning information received; and
  counting a number of received information of each type;
optionally, aggregating the transmission planning information comprises performing a windowed count of the received transmission planning information;
optionally, aggregating the transmission planning information comprises applying at least one exponential forgetting factor on a previous count of the received transmission planning information;
optionally, adapting the at least one transmission plan of the network node comprises switching from at least one transmission mode;
optionally, adapting the at least one transmission plan of the network node comprises switching between a first mode and a second mode;
optionally, the first mode comprises a static duplex mode and the second mode comprises a flexible duplex mode;
optionally, the first mode comprises a flexible duplex mode and the second mode comprises a static duplex mode;
optionally, each of the first mode and the second mode are independently selected from the group consisting of:
  a static duplex mode with equal downlink to uplink transmission ratio;
  a static duplex mode with high downlink to uplink transmission ratio;
  a static duplex mode with low downlink to uplink transmission ratio; and
  a flexible duplex mode;
optionally, if the transmission planning information indicates any change in buffer state, adapting the at least one transmission plan comprises transmitting, to a coordination cell group, 2 bit buffer state information directly.
optionally, the transmission planning information received from the plurality of network nodes is related to a respective traffic type of each of the plurality of network nodes.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
3 GPP Third Generation Partnership Project
AP Access Point
BS Base Station
BSC Base Station Controller
BTS Base Transceiver Station
CPE Customer Premises Equipment
D2D Device-to-device
DAS Distributed Antenna System
DCI Downlink Control Information
DFT Discrete Fourier Transform
DL Downlink
eNB evolved Node B
FDD Frequency Division Duplex
LAN Local Area Network
LBT Listen-Before-Talk
LEE Laptop Embedded Equipment
LME Laptop Mounted Equipment
LTE Long Term Evolution
M2M Machine-to-Machine
MAN Metropolitan Area Network
MCE Multi-cell/multicast Coordination Entity
MCS Modulation level and coding scheme
MSR Multi-standard Radio
NAS Non-Access Stratum
PSTN Public Switched Telephone Network
RB Resource Block
RNC Radio Network Controller
RRC Radio Resource Control
RRH Remote Radio Head
RRU Remote Radio Unit
TDD Time Division Duplex
TFRE Time Frequency Resource Element
TM Transmission Mode
TRP Transmission-Receive-Point
TTI Transmission Time Interval
UE User Equipment
UL Uplink
WAN Wide Area Network

The invention claimed is:

1. A method in a first network node scheduling time-division-duplexing, TDD, transmission for a first cell, the method comprising:
receiving transmission direction planning information from a plurality of other network nodes scheduling TDD transmissions for other cells, wherein the transmission direction planning information received from the plurality of network nodes indicate a respective buffer state per direction for each of the plurality of network nodes and wherein the respective buffer state of each of the plurality of network nodes is indicated using two bits or less; and
adapting at least one transmission direction plan of the first network node based on the transmission direction planning information received from the plurality of other network nodes, wherein adapting the at least one transmission direction plan of the first network node comprises switching between a first mode and a second mode, wherein the first mode comprises a static duplex mode and the second mode comprises a flexible duplex mode,
wherein the transmission direction planning information received from the plurality of network nodes further indicates a first number of network nodes from which an activation indication of static duplex mode is received and a second number of network nodes from which a deactivation indication of the static duplex mode is received, and
wherein switching between the first mode and the second mode is based at least on the first number of network nodes and the second number of network nodes.

2. The method of claim 1, wherein the first network node comprises one of:
an eNodeB;
a gNB;
a transmission-receive point; or
an access point.

3. The method of claim 1, further comprising transmitting transmission direction planning information associated with the first network node to the plurality of other network nodes.

4. The method of claim 1, wherein the transmission direction planning information comprises scheduling information related to an uplink or a downlink direction.

5. The method of claim 1, wherein the transmission direction planning information received from the plurality of network nodes is related to a respective buffer state of each of the plurality of network nodes.

6. The method of claim 5, wherein the respective buffer state of each of the plurality of network nodes comprises one of:
a first state where both a downlink buffer and an uplink buffer are empty;
a second state where the downlink buffer is not empty and an uplink buffer is empty;
a third state where the downlink buffer is empty and the uplink buffer is not empty; and
a fourth state where the downlink buffer is not empty and an uplink buffer is not empty.

7. The method of claim 6, wherein the fourth state may be further selected from a plurality of sub-states comprising one of:
a first sub-state wherein there is no preference to a downlink to uplink transmission ratio;
a second sub-state where there is a preference of a first downlink to uplink transmission ratio; and
a third sub-state where there is a preference of a second downlink to uplink transmission ratio.

8. The method of claim 6, wherein if the transmission direction planning information indicates a state change from any one of the first state, the second state, and the third state to the fourth state, the method further comprises transmitting an activation indication of static duplex.

9. The method of claim 6, wherein if the transmission direction planning information indicates a state change from the fourth state to any one of the first state, the second state, or the third state, the method further comprises transmitting a deactivation indication of static duplex.

10. The method of claim 6, wherein no signals are received during a transmission time interval, and adapting the at least one transmission direction plan comprises:
if a current state is the fourth state, applying a static duplex; and
if the current state is the first state, the second state, or the third state, applying a flexible duplex.

11. The method of claim 6, wherein signals are received during a transmission time interval, and adapting the at least one transmission direction plan comprises:
if a current state is a state two or a state three and if a number of activation indications minus a number of deactivation indications is less than or equal to a threshold value, applying flexible duplex; and if the current state is a state one or a state four or if the number of activation indication minus the number of deactivation indications is greater than the threshold value, applying static duplex.

12. The method of claim 6, further comprising determining that no signals were received from a first cell group during a transmission time interval, and adapting the at least one transmission direction plan comprises:

applying a static duplex if a current state is the fourth state; and applying a flexible duplex if the current state is any one of the first state, the second state, and the third state.

13. The method of claim 6, further comprising determining that signals were received from a first cell group during a transmission time interval, and adapting the at least one transmission direction plan comprises:

applying static duplex if a current state is the second state and a number of cells for which a last received signal is an uplink state is greater than a downlink state threshold;

applying flexible duplex if the current state is the second state and the number of cells for which the last received signal is the uplink state is less than or equal to a downlink state threshold;

applying static duplex if the current state is the third state and the number of cells for which the last received signal is the downlink state is greater than an uplink state threshold;

applying flexible duplex if the current state is the third state and the number of cells for which the last received signal is the downlink state is less than or equal to the uplink state threshold; and applying a static duplex if the current state is the fourth state.

14. The method of claim 1, wherein the transmission direction planning information received from the plurality of network nodes is related to a respective traffic direction pattern of each of the plurality of network nodes.

15. The method of claim 1, wherein, the respective traffic direction pattern comprises planned future transmission or predicted transmissions.

16. The method of claim 1, wherein the transmission direction planning information received from the plurality of network nodes is related to a respective downlink to uplink traffic ratio expected over a fixed number of upcoming subframes for each of the plurality of network nodes.

17. The method of claim 1, wherein the transmission direction planning information is conveyed in terms of a number of total bits to be delivered in an uplink direction or a downlink direction.

18. The method of claim 1, wherein the transmission direction planning information is conveyed in terms of a number of fixed higher layer packets to be delivered.

19. The method of claim 1, wherein the transmission direction planning information is received in a compressed format.

20. The method of claim 1, further comprising aggregating the transmission direction planning information received from the plurality of network nodes.

21. The method of claim 20, wherein aggregating the transmission direction planning information comprises:

identifying, for each of the plurality of network nodes, a type associated with the transmission direction planning information received; and counting a number of received information of each type.

22. The method of claim 20, wherein aggregating the transmission direction planning information comprises performing a windowed count of the received transmission direction planning information.

23. The method of claim 20, wherein aggregating the transmission direction planning information comprises applying at least one exponential forgetting factor on a previous count of the received transmission direction planning information.

24. The method of claim 1, wherein each of the first mode and the second mode are independently selected from the group consisting of:

a static duplex mode with equal downlink to uplink transmission ratio;

a static duplex mode with a first downlink to uplink transmission ratio;

a static duplex mode with a second downlink to uplink transmission ratio; and a flexible duplex mode.

25. The method of claim 1, wherein if the transmission direction planning information indicates any change in buffer state, adapting the at least one transmission direction plan comprises transmitting, to a coordination cell group, 2 bit buffer state information directly.

26. The method of claim 1, wherein the transmission direction planning information received from the plurality of network nodes is related to a respective traffic type of each of the plurality of network nodes.

27. A first network node scheduling time-division-duplexing, TDD, transmissions for a first cell, the first network comprising:

processing circuitry configured to:

receive transmission direction planning information from a plurality of other network nodes scheduling TDD transmissions for other cells, wherein the transmission direction planning information received from the plurality of network nodes indicate a respective buffer state per direction for each of the plurality of network nodes and wherein the respective buffer state of each of the plurality of network nodes is indicated using two bits or less; and adapt at least one transmission direction plan of the first network node based on the transmission direction planning information received from the plurality of other network nodes, wherein processing circuitry configured to adapt the at least one transmission direction plan of the first network node comprises processing circuitry configured to switch between a first mode and a second mode, wherein the first mode comprises a static duplex mode and the second mode comprises a flexible duplex mode, wherein the transmission direction planning information received from the plurality of network nodes further indicates a first number of network nodes from which an activation indication of static duplex mode is received and a second number of network nodes from which a deactivation indication of the static duplex mode is received, and wherein processing circuitry configured to switch between the first mode and the second mode comprises processing circuitry configured to switch based at least on the first number of network nodes and the second number of network nodes.

28. A non-transitory computer readable medium storing instructions, the instructions executable by a processor scheduling time-division-duplexing, TDD, transmissions for a first cell to cause the processor to:

receive transmission direction planning information from a plurality of other network nodes scheduling TDD transmissions for other cells, wherein the transmission direction planning information received from the plurality of network nodes indicate a respective buffer state per direction for each of the plurality of network nodes and wherein the respective buffer state of each of the plurality of network nodes is indicated using two bits or less; and adapt at least one transmission direction plan of the processor based on the transmission direction planning information received from the plurality of other network nodes, wherein instructions to cause the processor to adapt the at least one transmission direction plan of the first network node comprises instructions to cause the processor to switch between a first mode and a second mode, wherein the first mode comprises a static duplex mode and the second mode comprises a flexible duplex mode, wherein the transmission direction planning information received from the plurality of network nodes further indicates a first number of network nodes from which an activation indication of static duplex mode is received and a second number of network nodes from which a deactivation indication of the static duplex mode is received, and wherein instructions to cause the processor to switch between the first mode and the second mode comprises instructions to cause the processor to switch based at least on the first number of network nodes and the second number of network nodes.

29. A method in a first network node comprises:

obtaining transmission direction planning information from a plurality of network nodes which could include the first network node, each of the plurality of network nodes scheduling time-division-duplexing, TDD, transmissions for a respective cell, wherein the transmission direction planning information received from the plurality of network nodes indicate a respective buffer state per direction for each of the plurality of network nodes and wherein the respective buffer state of each of the plurality of network nodes is indicated using two bits or less; and adapting at least one transmission direction plan of at least one of said plurality of network nodes based on the transmission direction planning information received from the plurality of other network nodes, wherein adapting the at least one transmission direction plan of the first network node comprises switching between a first mode and a second mode, wherein the first mode comprises a static duplex mode and the second mode comprises a flexible duplex mode, wherein the transmission direction planning information received from the plurality of network nodes further indicates a first number of network nodes from which an activation indication of static duplex mode is received and a second number of network nodes from which a deactivation indication of the static duplex mode is received, and wherein switching between the first mode and the second mode is based at least on the first number of network nodes and the second number of network nodes.

30. A non-transitory computer readable medium storing instructions, the instructions executable by a processor to cause the processor to:

obtain transmission direction planning information from a plurality of network nodes, each of the plurality of network nodes scheduling time-division-duplexing, TDD, transmissions for a respective cell, wherein the transmission direction planning information received from the plurality of network nodes indicate a respective buffer state per direction for each of the plurality of network nodes and wherein the respective buffer state of each of the plurality of network nodes is indicated using two bits or less; and adapt at least one transmission direction plan of at least one of said plurality of network nodes based on the transmission direction planning information received from the plurality of network nodes, wherein instructions to cause the processor to adapt the at least one transmission direction plan of the first network node comprises instructions to cause the processor to switch between a first mode and a second mode, wherein the first mode comprises a static duplex mode and the second mode comprises a flexible duplex mode, wherein the transmission direction planning information received from the plurality of network nodes further indicates a first number of network nodes from which an activation indication of static duplex mode is received and a second number of network nodes from which a deactivation indication of the static duplex mode is received, and wherein instructions to cause the processor to switch between the first mode and the second mode comprises instructions to cause the processor to switch based at least on the first number of network nodes and the second number of network nodes.

* * * * *